United States Patent
Park et al.

(10) Patent No.: US 11,398,663 B2
(45) Date of Patent: Jul. 26, 2022

(54) BATTERY MODULE HAVING BUS BAR AND BATTERY PACK

(71) Applicant: LG Chem, Ltd., Seoul (KR)

(72) Inventors: Ji-Soo Park, Daejeon (KR); Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 62 days.

(21) Appl. No.: 16/758,299

(22) PCT Filed: Jan. 25, 2019

(86) PCT No.: PCT/KR2019/001111
§ 371 (c)(1),
(2) Date: Apr. 22, 2020

(87) PCT Pub. No.: WO2019/245126
PCT Pub. Date: Dec. 26, 2019

(65) Prior Publication Data
US 2020/0321590 A1    Oct. 8, 2020

(30) Foreign Application Priority Data

Jun. 18, 2018  (KR) ........................ 10-2018-0069707

(51) Int. Cl.
*H01M 50/502* (2021.01)
*H01M 50/20* (2021.01)
(Continued)

(52) U.S. Cl.
CPC ..... *H01M 50/502* (2021.01); *H01M 10/0422* (2013.01); *H01M 50/20* (2021.01);
(Continued)

(58) Field of Classification Search
CPC .... H01M 50/10; H01M 50/20; H01M 50/502; H01M 50/531; H01M 50/572
See application file for complete search history.

(56) References Cited

U.S. PATENT DOCUMENTS 5,418,083 A    5/1995 Tamaki et al.
2008/0081252 A1    4/2008 Miyazaki
(Continued)

FOREIGN PATENT DOCUMENTS

CN    102244225 A    11/2011
CN    206480686 U    9/2017
(Continued)

OTHER PUBLICATIONS

Machine Translation of: JP 2013/196907, Kimura et al., Sep. 30, 2013.*
(Continued)

*Primary Examiner* — Kenneth J Douyette
(74) *Attorney, Agent, or Firm* — Morgan, Lewis & Bockius LLP

(57) ABSTRACT

Provided are a battery module including a bus bar, whereby weldability may be increased by reducing current loss when welding the bus bar and an electrode terminal of a battery cell, and a battery pack including the battery module. The battery module includes: a plurality of cylindrical battery cells; a module housing; and a bus bar configured to contact the electrode terminals of the plurality of cylindrical battery cells to electrically connect between the plurality of cylindrical battery cells, wherein the bus bar includes: a main body portion that is positioned over or below the plurality of cylindrical battery cells and has a plate shape that is flat in a horizontal direction, wherein at least one coupling opening perforated vertically is formed in the plate shape; and a first connection extension portion and a second connection extension portion that protrude and extend from an internal (Continued)

boundary of the coupling opening in different horizontal directions from each other and have end portions that are electrically connected and fixed to an electrode terminal of one of the plurality of cylindrical battery cells.

9 Claims, 8 Drawing Sheets

(51) Int. Cl.
    *H01M 50/572* (2021.01)
    *H01M 50/531* (2021.01)
    *H01M 10/04* (2006.01)
(52) U.S. Cl.
    CPC ....... *H01M 50/531* (2021.01); *H01M 50/572* (2021.01); *H01M 2220/10* (2013.01); *H01M 2220/20* (2013.01)

(56) References Cited

U.S. PATENT DOCUMENTS

| | | |
|---|---|---|
| 2009/0229849 A1 | 9/2009 | Yang et al. |
| 2011/0281151 A1 | 11/2011 | Lee |
| 2015/0380713 A1 | 12/2015 | Kimura et al. |
| 2016/0301056 A1 | 10/2016 | Yi |
| 2018/0358603 A1 | 12/2018 | Nakayama et al. |
| 2019/0109356 A1 | 4/2019 | Kaga |

FOREIGN PATENT DOCUMENTS

| | | |
|---|---|---|
| EP | 3 570 347 A1 | 11/2019 |
| EP | 3 686 956 A1 | 7/2020 |
| JP | 7-134976 A | 5/1995 |
| JP | 2000-106170 A | 4/2000 |
| JP | 2008-091182 A | 4/2008 |
| JP | 2008-097942 A | 4/2008 |
| JP | 5063897 B2 | 10/2012 |
| JP | 2013-196907 A | 9/2013 |
| JP | 2013-196955 A | 9/2013 |
| JP | 2014-110145 A | 6/2014 |
| JP | 2014-135204 A | 7/2014 |
| JP | 2014-154337 A | 8/2014 |
| JP | 2015-099726 A | 5/2015 |
| JP | 2017-111896 A | 6/2017 |
| JP | 2017-157509 A | 9/2017 |
| KR | 10-2009-0098625 A | 9/2009 |
| KR | 10-2014-0133709 A | 11/2014 |
| KR | 10-2017-0106933 A | 9/2017 |
| WO | 2017-081838 A1 | 5/2017 |

OTHER PUBLICATIONS

Machine Translation of: JP 2017/157509, Takashi et al., Sep. 7, 2017.*
International Search Report issued in corresponding International Patent Application No. PCT/KR2019/001111, dated May 9, 2019.
Office Action dated Apr. 19, 2021, issued in corresponding Japanese Patent Application No. 2020-524577.
Extended European Search Report issued in corresponding European Patent Application No. 19822859.5, dated Feb. 3, 2021.
Office Action dated Jan. 27, 2022, issued in corresponding Chinese Patent Application No. 201980005378.

\* cited by examiner

BATTERY MODULE HAVING BUS BAR AND BATTERY PACK

TECHNICAL FIELD

The present disclosure relates to a battery module including a bus bar and a battery pack including the battery module, and more particularly, to a battery module including a bus bar, in which weldability between a bus bar and an electrode terminal of a cylindrical battery cell may be increased by reducing current loss when welding the bus bar and the electrode terminal, and a battery pack including the battery module.

The present application claims priority to Korean Patent Application No. 10-2018-0069707 filed on Jun. 18, 2018 in the Republic of Korea, the disclosures of which are incorporated herein by reference.

BACKGROUND ART

Recently, demands for portable electronic products, such as laptop computers, video cameras, portable phones, etc. have rapidly increased, and development of electric vehicles, batteries for energy storage, robots, and satellites, etc. has increased, and thus studies on high-performance secondary batteries capable of repetitive charging and discharging are actively conducted.

Currently commercialized secondary batteries include nickel cadmium batteries, nickel hydrogen batteries, nickel-zinc batteries, lithium secondary batteries, etc., and thereamong, the lithium secondary batteries are in the limelight because the lithium secondary batteries have almost no memory effect compared to nickel-based secondary batteries and are thus freely charged and discharged, have a very low self-discharge rate, and have high energy density.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate respectively coated with a positive electrode active material and a negative electrode active material are arranged with a separator included therebetween, and an exterior material, i.e., a battery case, sealing and accommodating the electrode assembly with an electrolyte solution together.

The lithium secondary battery may be classified according to a shape of the exterior material, into a can-type secondary battery, in which the electrode assembly is embedded in a metal can, and a pouch-type secondary battery, in which an electrode assembly is embedded in a pouch of an aluminum laminate sheet.

In the can-type secondary battery, a metal can including an electrode assembly may be manufactured in a cylindrical shape. The can-type secondary battery may be used to configure a battery module including a housing accommodating a plurality of secondary batteries and a bus bar configured to electrically connect the plurality of secondary batteries.

Recently, a bus bar included in such a battery module has been manufactured using a material having a relatively high electrical resistance to increase weldability of resistance welding with respect to an electrode terminal.

However, the bus bar may be a factor that increases current loss in a current generated in a secondary battery and transferred to an external device, thus degrading energy efficiency. Also, the higher the electrical resistance of a material, the lower the thermal conductivity of the material is. Thus, the material may be a factor that degrades heat dissipation performance of a battery module in which the bus bar as described above is applied.

On the other hand, when a bus bar formed using a material having a low electrical resistance is used, it is difficult to generate sufficient resistance heat when bonding an electrode terminal and a bus bar to each other by resistance welding, and thus weldability may be degraded. Also, it may take a long time to perform a welding operation. Thus, the manufacturing costs are increased, and durability of a battery module is degraded.

DISCLOSURE

Technical Problem

The present disclosure is designed to solve the problems of the related art, and therefore the present disclosure is directed to providing a battery module including a bus bar, in which weldability may be increased by reducing current loss when welding a bus bar and an electrode terminal of a cylindrical battery cell, and a battery pack including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a plurality of cylindrical battery cells including electrode terminals respectively formed at upper and lower portions of the plurality of cylindrical cells, the plurality of cylindrical battery cells being arranged in a horizontal direction; a module housing including an accommodation portion into which the plurality of cylindrical battery cells are inserted and accommodated therein; and a bus bar configured to contact the electrode terminals of the plurality of cylindrical battery cells to electrically connect between the plurality of cylindrical battery cells, the bus bar including a main body portion that is positioned over or below the plurality of cylindrical battery cells and has a plate shape that is flat in a horizontal direction, wherein at least one coupling opening perforated vertically is formed in the plate shape; and a first connection extension portion and a second connection extension portion that protrude and extend from an internal boundary of the coupling opening in different horizontal directions from each other and have end portions that are electrically connected and fixed to an electrode terminal of one of the plurality of cylindrical battery cells.

Also, at least one of the first connection extension portion and the second connection extension portion may include a bent structure that is bent at least once in a horizontal direction.

Furthermore, at least one of the first connection extension portion and the second connection extension portion may include a curved structure that is curved at least once in a horizontal direction.

In addition, at least one of the first connection extension portion and the second connection extension portion may include a terminal mounting structure in which a lower surface of an end of the at least one of the first connection extension portion and the second connection extension portion that is connected and fixed to the electrode terminal is internally recessed in an outward direction with respect to a center of the battery module, and the internally recessed lower surface is mounted on the electrode terminal.

Also, at least one of the first connection extension portion and the second connection extension portion may include a stepped structure that is configured to be mounted on the electrode terminal as an end portion that is coupled and connected to the electrode terminal and stepped by being bent in an outward direction with respect to the battery module.

Furthermore, at least one of the first connection extension portion and the second connection extension portion may include a concave structure that is inwardly curved to allow a width of portions of the first connection extension portion and the second connection extension portion connected to a boundary of the coupling opening to decrease.

In addition, an embossed protrusion protruding in a direction toward where the electrode terminal is positioned may be formed in the first connection extension portion and the second connection extension portion.

Also, an insertion groove into which a welding rod is inserted may be formed in the upper portion of the embossed protrusion of each of the first connection extension portion and the second connection extension portion.

Furthermore, the bus bar may include copper or a copper alloy.

In another aspect of the present disclosure, there is also provided a battery pack including at least two of the above-described battery modules.

In another aspect of the present disclosure, there is also provided a device including the battery pack described above.

Advantageous Effects

According to an aspect of the present disclosure, according to the battery module of the present disclosure, by forming the first connection extension portion and the second connection extension portion of the bus bar, which protrude and extend in different horizontal directions from the internal boundary of the coupling opening and connecting and fixing the electrode terminal to the end portions of the first connection extension portion and the second connection extension portion by resistance welding, an amount of electricity flowing between the first connection extension portion and the second connection extension portion may be increased effectively, and thus, efficiency of resistance welding and bonding reliability may be improved.

Also, according to an aspect of another embodiment of the present disclosure, by setting a width of portions of the first connection extension portion and the second connection extension portion connected to a boundary of a coupling opening is narrowed to be smaller than the other portions of a body of the first connection extension portion and the second connection extension portion, electrical resistance of the narrowed width portion may be increased, and thus, an amount of electricity flowing through the electrode terminal and the end portions of the first connection extension portion and the second connection extension portion may be further increased, thereby improving resistance welding efficiency and bonding reliability.

Moreover, according to an aspect of the present disclosure, when at least one of the first connection extension portion and the second connection extension portion has a bent structure that is bent at least once, a length from an internal boundary of a coupling opening to an end portion of each of the first connection extension portion and the second connection extension portion may be further extended, and thus, a longer path of current flow may be set.

Also, according to an aspect of the present disclosure, by forming the first connection extension portion and the second connection extension portion according to the present disclosure, which have a curved structure that is curved at least once, a length from an internal boundary of a coupling opening to an end portion of each of the first connection extension portion and the second connection extension portion may be further extended, and thus, a longer path of current flow may be set.

Furthermore, according to an aspect of the present disclosure, by forming a terminal mounting structure in at least one of the first connection extension portion and the second connection extension portion, a resistance of a current flow between the first connection extension portion and the second connection extension portion and the electrode terminal may be reduced, and moreover, the first connection extension portion and the second connection extension portion may be easily positioned at the electrode terminal, thus further increasing the manufacturing efficiency.

Also, according to an aspect of the present disclosure, by forming a terminal mounting structure in at least one of the first connection extension portion and the second connection extension portion, a resistance of a current flow between the first connection extension portion and the second connection extension portion and the electrode terminal may be reduced, and moreover, the first connection extension portion and the second connection extension portion may be easily positioned on the electrode terminal, thus further increasing the manufacturing efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
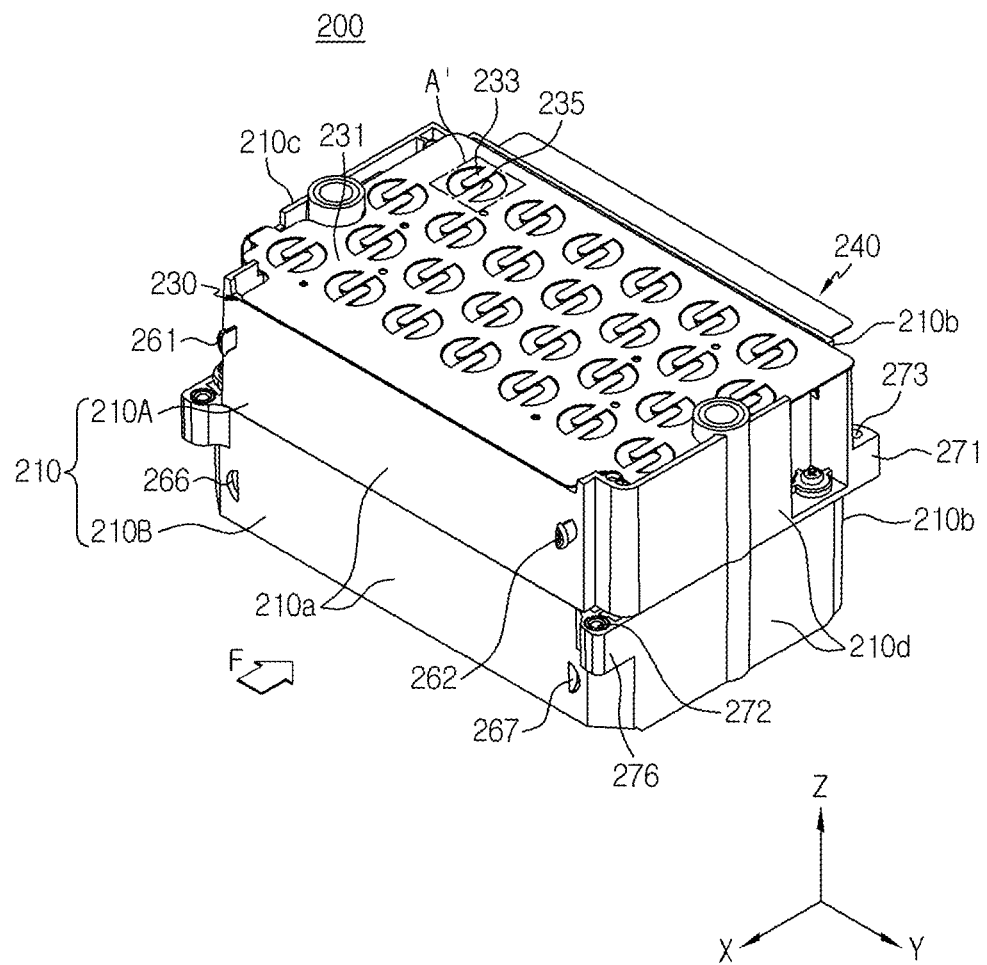
FIG. 1 is a perspective view schematically showing a battery module according to an embodiment of the present disclosure.
Figure 2:
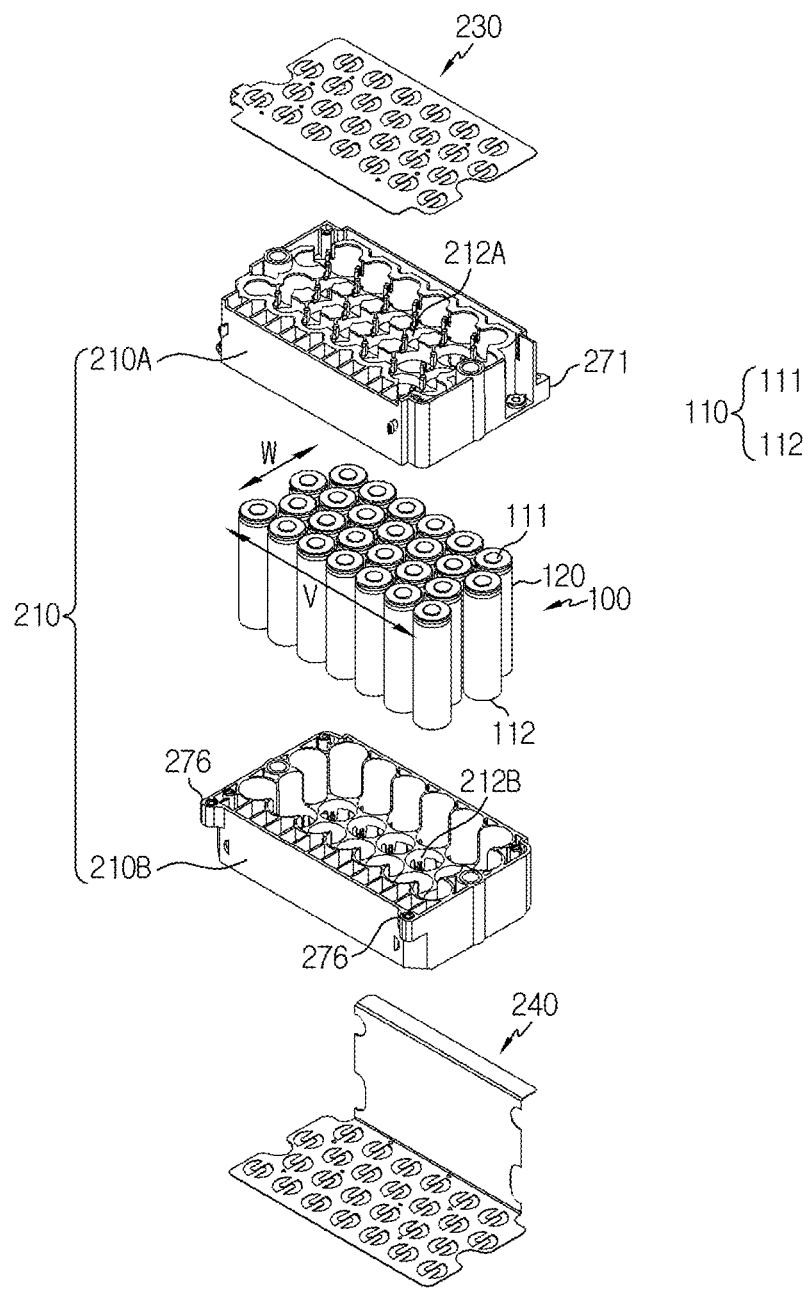
FIG. 2 is a disassembled perspective view schematically showing a battery module according to an embodiment of the present disclosure.

FIG. 1 is a perspective view schematically showing a battery module according to an embodiment of the present disclosure. FIG. 2 is a disassembled perspective view schematically showing a battery module according to an embodiment of the present disclosure.

Referring to FIGS. 1 and 2, a battery module 200 according to the present disclosure may include a cylindrical battery cell 100, a module housing 210, and two bus bars 230 and 240.

Here, the cylindrical battery cell 100 may include a cylindrical battery can 120 and an electrode assembly (not shown) accommodated in the battery can 120.

Also, the battery can 120 includes a material having a high electrical conductivity, and for example, the battery can 120 may include an aluminum or copper material.

Moreover, the battery can 120 may be configured in a vertically extending shape. Also, the battery can 120 may be a vertically extending cylindrical shape. Moreover, electrode terminals 110 may be respectively formed at upper and lower portions of the battery can 120. In detail, a positive electrode terminal 111 may be formed on a flat circular upper surface at an upper end of the battery can 120, and a negative electrode terminal 112 may be formed on a flat circular lower surface at a lower end of the battery can 120.

Furthermore, the cylindrical battery cell 100 may be arranged in a plurality of columns and rows in a horizontal direction. The horizontal direction may refer to a direction parallel to a ground surface on which the cylindrical battery cell 100 is placed, and may also refer to at least one direction on a plane perpendicular to a vertical direction. Also, the horizontal direction may be X- and Y-directions of FIG. 1.

For example, as illustrated in FIG. 2, the battery module 200 may include a plurality of cylindrical battery cells 100 arranged in four rows in a back and forth direction (W-direction of FIG. 2) and in seven or six rows in a left and right direction (V-direction).

Also, the electrode assembly (not shown) may have a structure in which a positive electrode and a negative electrode are wound in a jelly-roll form with a separation layer interposed between the positive and negative electrodes. A positive electrode tab may be attached to the positive electrode (not shown) to be connected to the positive electrode terminal 111 at the upper end of the battery can 120. A negative electrode tab may be attached to the negative electrode (not shown) to be connected to the negative electrode terminal 112 at the lower end of the battery can 120.

Meanwhile, the module housing 210 may include accommodation portions 212A and 212B into which the cylindrical battery cell 100 may be inserted to be accommodated therein. In detail, a plurality of hollow structures formed to surround an outer side surface of the cylindrical battery cell 100 may be formed in the accommodation portions 212A and 212B. Here, the module housing 210 may include an electrical insulation material. For example, the electrical insulation material may be a plastic material. In detail, the plastic material may be polyvinyl chloride (PVC).

Also, the module housing 210 may include a first outer side wall 210a, a second outer side wall 210b, a third outer side wall 210c, and a fourth outer side wall 210d that are formed to form an internal space of the module housing 210 and respectively in a front direction, a back direction, a left direction, and a right direction.

Also, coupling protrusions 261 and 262 and guide grooves 266 and 267 that are used to guide an arrangement position of another battery module 200 may be formed in at least one of the first outer side wall 210a, the second outer side wall 210b, the third outer side wall 210c, and the fourth outer side wall 210d of the module housing 210.

For example, as illustrated in FIG. 1, two coupling protrusions 261 and 262 and two guide grooves 266 and 267 may be respectively formed in the first outer side wall 210a and the second outer side wall 210b of the module housing 210.

Thus, according to this configuration of the present disclosure, the coupling protrusions 261 and 262 of the module housing 210 according to the present disclosure may be inserted into the guide grooves 266 and 267 formed in the second outer side wall 210b of another module housing 210 to be fastened and fixed thereto, and thus, another battery module 201 (FIG. 10) connected to one battery module 200 may be easily arranged, and the battery modules may be fixed so that they are not easily separated.

Referring back to FIGS. 1 and 2, a upper case 210A may include a first protruded fastening portion 271, and a lower case 210B may include a second protruded fastening portion 276.

In detail, the first protruded fastening portion 271 may protrude and extend backward from an outer surface of the second outer side wall 210b of the first upper case 210A when viewed in an F direction. Also, the second protruded fastening portion 276 may protrude and extend forward from an outer surface of the first outer side wall 210a of the lower case 210B when viewed in the F direction.

The terms indicating directions, such as front, back, left, right, up, and down may vary depending on a position of an observer or a manner in which an object is placed. However, for convenience of description, directions, such as front, back, left, right, up, and down, viewed in the F-direction are described in the present specification.

Figure 10:
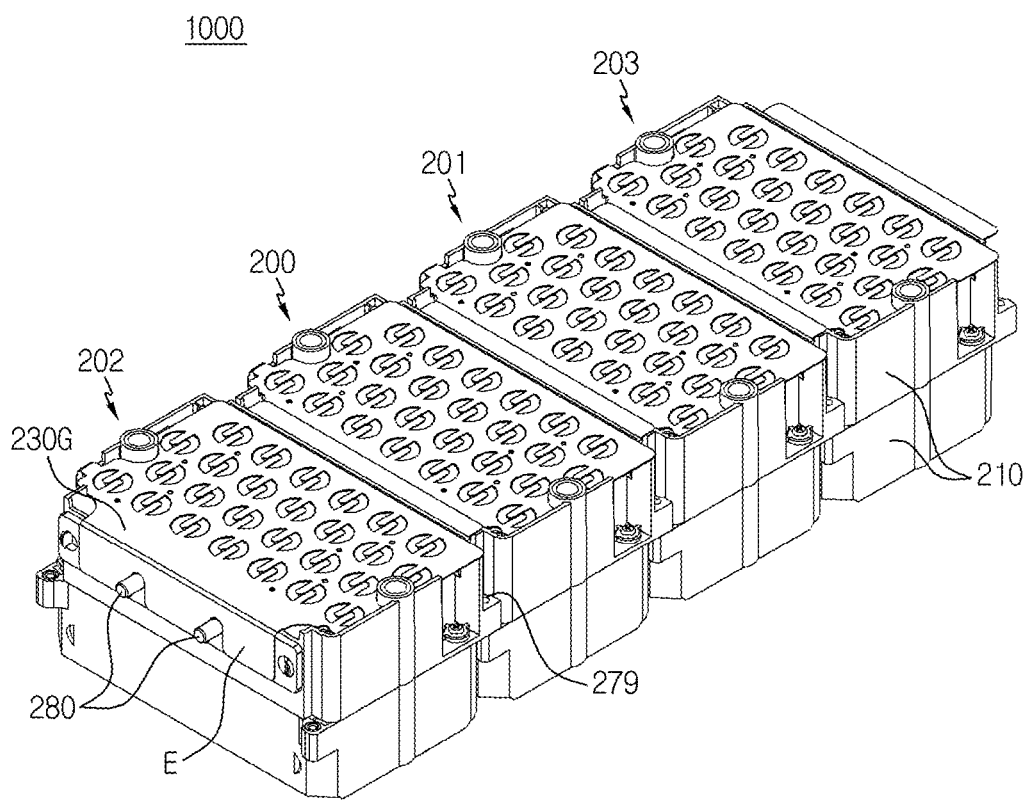
FIG. 10 is a perspective view schematically illustrating a battery pack according to an embodiment of the present disclosure.

Also, through holes 273, 272 may be respectively formed in the first protruded fastening portion 271 and the second protruded fastening portion 276 so as to insert a fastening bolt 279 (FIG. 10). For example, as illustrated in FIG. 1, the first protruded fastening portion 271 of the module housing 210 may be fastened and coupled to the second protruded fastening portion 276 of another battery module 201 (FIG. 10) through the fastening bolt 279.

Here, the through hole 272 of the second protruded fastening portion 276 may be communicatively connected to the through hole 273 of the first protruded fastening portion 271 of the upper case 210A of another battery module 200 such that the fastening bolt 279 is continuously inserted into the through holes 273 and 272. Accordingly, in the one battery module 200 and the other battery module (201 of FIG. 10), the battery modules (200, 201, 202, 203 of FIG. 10) may be arranged as the first protruded fastening portion 271 and the second protruded fastening portion 276 are fastened to each other by using the fastening bolt 279.

Accordingly, according to this configuration of the present disclosure, as the first protruded fastening portion 271 of the upper case 210A is fastened to the second protruded fastening portion 276 of the lower case 210B of another battery module 200 via a bolt, breaking of the arrangement of the battery modules 200 may be prevented, and particularly, disconnection of electrical connection between a bus bar 230 in an upper portion and a bus bar 240 in a lower portion may be prevented.

Meanwhile, the module housing 210 may include the upper case 210A and the lower case 210B.

Figure 3:
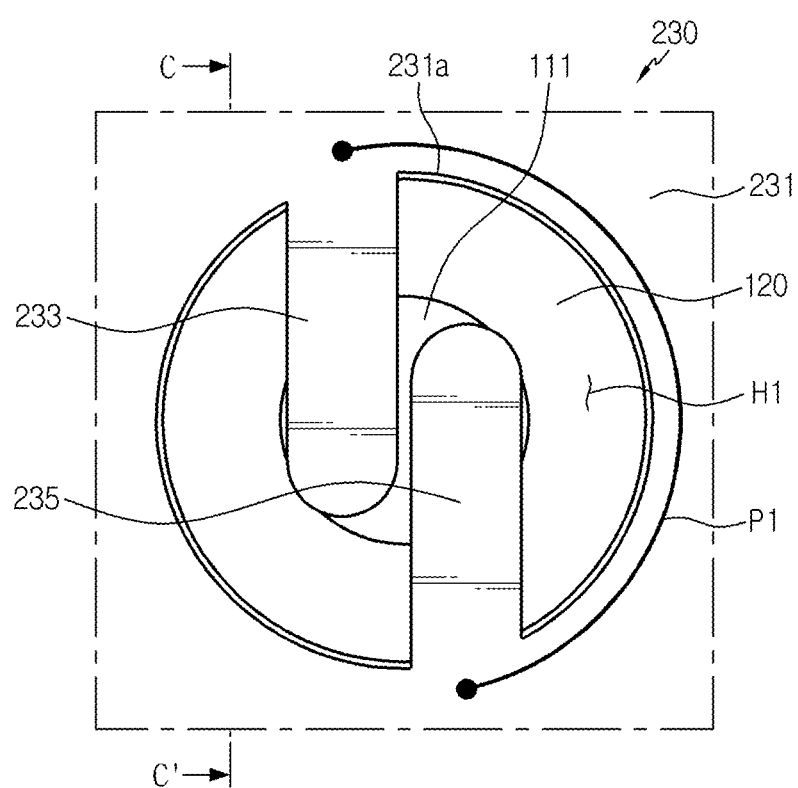
FIG. 3 is a partial plan view schematically showing a region A' of a bus module of FIG. 1.

FIG. 3 is a partial plan view schematically showing a region A' of the bus module of FIG. 1.

Referring to FIG. 3 with FIG. 2, the bus bar 230 may include a structure in which a surface of the bus bar 230 contacts electrode terminals 110 of at least two cylindrical battery cells 100 from among the plurality of cylindrical battery cells 100 to be electrically connected to the cylindrical battery cells 100. That is, the bus bar 230 may be configured to contact the positive electrode terminal 111 or the negative electrode terminal 112 of the plurality of cylindrical battery cells 100 to electrically connect between the plurality of cylindrical battery cells 100. In detail, the bus bar 230 may include a main body portion 231, a first connection extension portion 233, and a second connection extension portion 235.

Here, the main body portion 231 may have a plate shape that is flat in a horizontal direction. In other words, the main body portion 231 may have a plate shape having upper and lower surfaces that are broader than a lateral surface thereof in a horizontal direction (x-direction, y-direction). Also, the main body portion 231 may be positioned on or under the plurality of cylindrical battery cells 100 where the positive electrode terminal 111 or the negative electrode terminal 112 is formed. Also, the main body portion 231 may include a conductive metal to electrically connect the plurality of cylindrical battery cells.

Also, at least one coupling opening H1 perforated vertically may be formed in the main body portion 231. Moreover, the first connection extension portion 233 and the second connection extension portion 235 may protrude and extend in different horizontal directions (x-direction, y-direction) from an internal boundary 231a of the coupling opening H1. That is, the first connection extension portion 233 and the second connection extension portion 235 may be formed to be positioned within the coupling opening H1.

That is, a boundary of the coupling opening H1 of the bus bar 230 may be connected to the other end portions of the first connection extension portion 233 and the second connection extension portion 235, and the other portions of the first connection extension portion 233 and the second connection extension portion 235 may be positioned within the coupling opening H1 so as to be electrically insulated from the main body portion 231.

Also, protruding end portions of the first connection extension portion 233 and the second connection extension portion 235 may be formed to be electrically connected and fixed to one electrode terminal 110 of one of the plurality of cylindrical battery cells 100.

Furthermore, the first connection extension portion 233 and the second connection extension portion 235 that protrude and extend in different horizontal directions may be arranged such that a distance P1 between respective positions thereof connected to the internal boundary 231a of the coupling opening H1 is greater than a distance between those of connection extension portions (not shown) that protrude and extend in parallel in a same direction and adjacent to each other.

Accordingly, according to the bus bar 230 of the present disclosure, when connecting a welding rod of a resistance welding apparatus to the end portions of the first connection extension portion 233 and the second connection extension portion 235 which are to be welded, a longer path of a current flow flowing between the first connection extension portion 233 and the second connection extension portion 235 may be set. The longer a path of a current flow, the better an amount of electricity flowing between the first connection extension portion 233 and the second connection extension portion 235 along a boundary of the coupling opening H1 during resistance welding may be reduced.

Thus, according to this configuration of the present disclosure, by forming the first connection extension portion 233 and the second connection extension portion 235 of the bus bar 230 that protrude and extend in different horizontal directions from the internal boundary 231a of the coupling opening H1 and connecting and fixing the electrode terminal 110 to the end portions of the first connection extension portion 233 and the second connection extension portion 235 by resistance welding, an amount of electricity flowing between the first connection extension portion 233 and the second connection extension portion 235 may be reduced effectively.

On the other hand, according to the present disclosure, an amount of electricity flowing between the electrode terminal 110 and the end portions of the first connection extension portion 233 and the second connection extension portion 235 may be increased, thus increasing resistance welding efficiency and bonding reliability. In particular, when a bus bar is formed of a lower electrical resistance than a bus bar formed of a nickel metal according to the related art, it is difficult to easily generate a high resistance heat, and thus, the above-described effect may be increased all the more.

In addition, the first connection extension portion 233 and the second connection extension portion 235 may respectively protrude and extend from two corresponding side portions of the internal boundary 231a of the coupling opening H1 in a horizontal direction. The first connection extension portion 233 and the second connection extension portion 235 may be spaced apart from each other by a certain distance to prevent direct contact therebetween.

For example, as illustrated in FIG. 3, the first connection extension portion 233 and the second connection extension portion 235 may protrude and extend from the internal boundary 231a of the coupling opening H1 from opposite positions. In this case, a longest path of a current flow between the first connection extension portion 233 and the second connection extension portion 235 may be set, thus maximizing the increase in resistance welding efficiency and bonding reliability.

Figure 4:
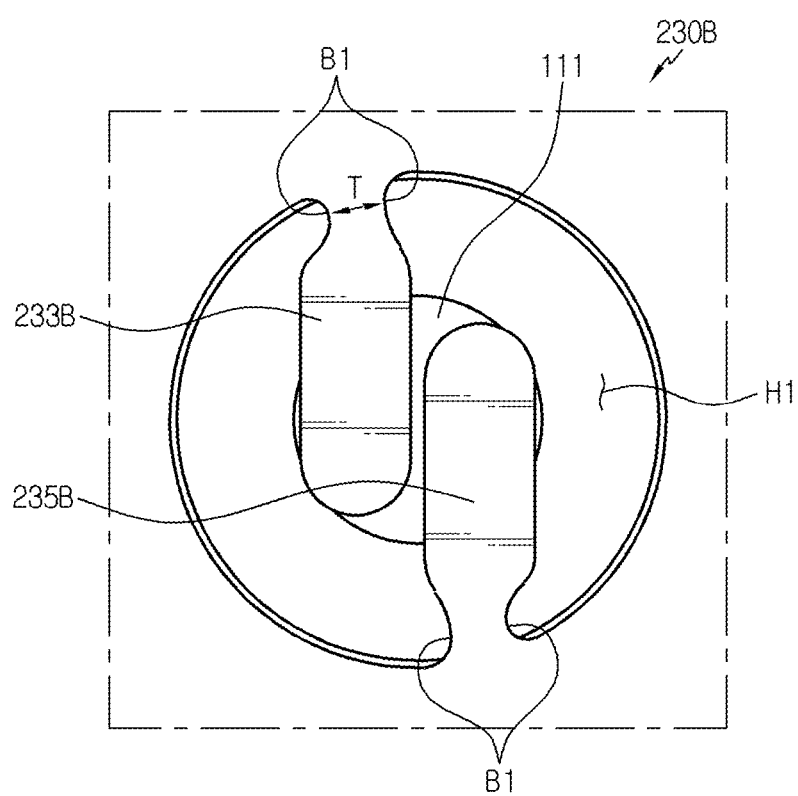
FIG. 4 is a partial plan view schematically showing a portion of a battery module according to another embodiment of the present disclosure.

FIG. 4 is a partial plan view schematically showing a portion of a battery module according to another embodiment of the present disclosure.

Referring to FIG. 4, a bus bar 230B according to another embodiment of the present disclosure may include a concave structure B1 that is inwardly curved such that a width T1 of portions of a first connection extension portion 233B and a second connection extension portion 235B connected to a boundary of the coupling opening H1 is narrowed. In detail, the bus bar 230B may include the concave structure B1 in each of the first connection extension portion 233B and the second connection extension portion 235B.

For example, as illustrated in FIG. 4, the concave structure B1 that is inwardly curved such that the width T1 of the portions of the first connection extension portion 233B and the second connection extension portion 235B connected to the boundary of the coupling opening H1 are narrowed may be formed in each of the first connection extension portion 233B and the second connection extension portion 235B.

Accordingly, according to this configuration of the present disclosure, when the width T1 of the portions of the first connection extension portion 233B and the second connection extension portion 235B that are connected to the boundary of the coupling opening H1 is narrowed to be smaller than the other portions of the body of the first connection extension portion 233B and the second connection extension portion 235B, electrical resistance of the narrowed width portion T may be increased, and thus, an amount of electricity flowing through the electrode terminal 110 and the end portions of the first connection extension portion 233B and the second connection extension portion 235B may be further increased, thereby improving resistance welding efficiency and bonding reliability.

Figure 5:
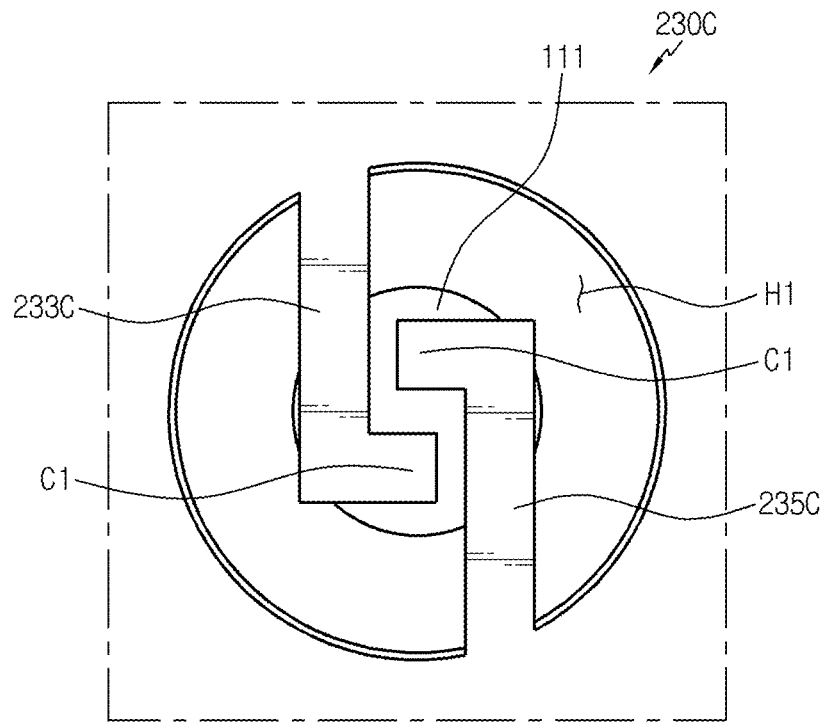
FIG. 5 is a partial plan view schematically showing a portion of a battery module according to another embodiment of the present disclosure.

FIG. 5 is a partial plan view schematically showing a portion of a battery module according to another embodiment of the present disclosure.

Referring to FIG. 5, at least one of a first connection extension portion 233C and a second connection extension portion 235C of a bus bar 230C of FIG. 5 may include a bent structure C1 that is bent at least once in a horizontal direction. In detail, each of the first connection extension portion 233C and the second connection extension portion 235C may have a bent structure C1 that is bent in a horizontal direction.

For example, as illustrated in FIG. 5, each of the first connection extension portion 233C and the second connection extension portion 235C may have a bent structure C1 that is vertically bent once in a direction toward where the electrode terminal 110 is positioned.

Accordingly, according to this configuration of the present disclosure, by forming the first connection extension portion 233C and the second connection extension portion 235C according to the present disclosure, which have the bent structure C1 that is bent at least once, a length from an internal boundary of the coupling opening H1 to the end portion of each of the first connection extension portion 233C and the second connection extension portion 235C may be further extended, and thus a longer path of current flow may be set.

Moreover, when an end portion of the bent structure C1 of each of the first connection extension portion 233C and the second connection extension portion 235C is bonded to the electrode terminal 110, due to vibration caused by an external impact applied to the battery module 200 later, the risk of cracks in or fracture of the first connection extension portion 233C and the second connection extension portion 235C may be reduced.

The stress or fatigue due to vibration may be prevented from being concentrated on a portion of the boundary 231a of the coupling opening H1 to which the first connection extension portion 233C and the second connection extension portion 235C are connected, but the stress or fatigue may be primarily absorbed by the bent structure C1 of the first connection extension portion 233C and the second connection extension portion 235C, and thus, durability of the first connection extension portion 233C and the second connection extension portion 235C may be further increased.

Figure 6:
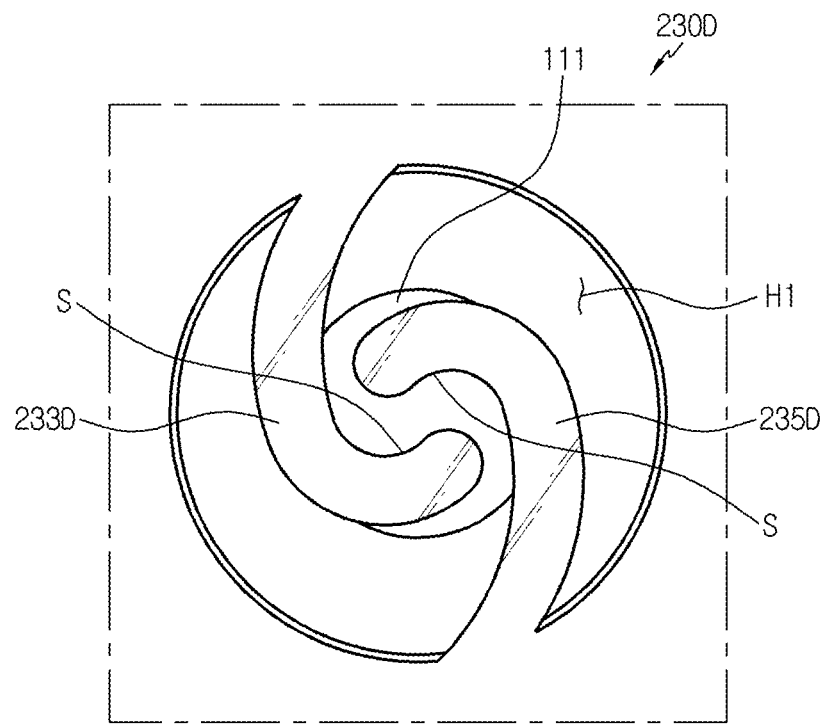
FIG. 6 is a partial plan view schematically showing a portion of a battery module according to another embodiment of the present disclosure.

FIG. 6 is a partial plan view schematically showing a portion of a battery module according to another embodiment of the present disclosure.

Referring to FIG. 6, at least one of a first connection extension portion 233D and a second connection extension portion 235D of a bus bar 230D according to another embodiment may include a curved structure S that is curved at least once in a horizontal direction. In detail, each of the first connection extension portion 233D and the second connection extension portion 235D may include a curved structure S that is curved at least once in a horizontal direction.

For example, as illustrated in FIG. 6, each of the first connection extension portion 233D and the second connection extension portion 235D may have a curved structure S that is curved once in a horizontal direction in a direction toward where an electrode terminal (the positive electrode terminal 111) is positioned.

Like the first connection extension portion 233C and the second connection extension portion 235C of FIG. 5, in the first connection extension portion 233D and the second connection extension portion 235D of FIG. 6, a long path of current flow may be formed via the curved structure S that is curved one or more times.

Accordingly, according to this configuration of the present disclosure, by forming the first connection extension portion 233D and the second connection extension portion 235D according to the present disclosure, which have the curved structure S that is curved at least once, a length from an internal boundary of a coupling opening to an end portion of each of the first connection extension portion 233D and the second connection extension portion 235D may be further extended, thereby setting a longer path of current flow.

Moreover, when an end portion of the curved structure S of the first connection extension portion 233D and the second connection extension portion 235D is bonded to the electrode terminal 110, the risk of cracks in or fracture of the first connection extension portion 233D and the second connection extension portion 235D due to vibration caused by an external impact applied to the battery module 200 later may be reduced.

The stress or fatigue due to vibration may be prevented from being concentrated on a portion of the boundary of the coupling opening H1 to which the first connection extension portion 233D and the second connection extension portion 235D are connected, but the stress or fatigue may be primarily absorbed by the curved structure S of the first connection extension portion 233D and the second connection extension portion 235D, and thus, durability of the first connection extension portion 233D and the second connection extension portion 235D may be further increased.

Figure 7:
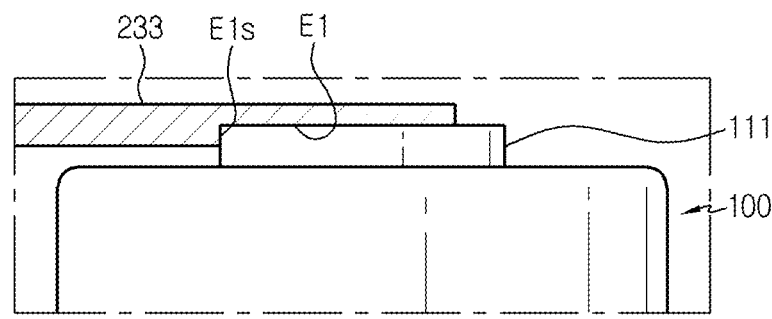
FIG. 7 is a partial side cross-sectional view schematically showing a portion of a side surface of the battery module of FIG. 3 cut along line C-C'.

FIG. 7 is a partial side cross-sectional view schematically showing a portion of a side surface of the battery module of FIG. 3 cut along line C-C'.

Referring to FIG. 7 with FIG. 2, a lower surface of an end of at least one of the first connection extension portion 233 and the second connection extension portion (not shown) according to the present disclosure may be connected and fixed to the electrode terminal 110. Also, a lower surface of an end of at least one of the first connection extension portion 233 and the second connection extension portion may be internally recessed in an outward direction with respect to a center of the battery module 200. Furthermore, the lower surface of the end of at least one of the first connection extension portion 233 and the second connection extension portion may be internally recessed to be mounted on the electrode terminal 110 to thereby form a terminal mounting structure E1.

In detail, both the first connection extension portion 233 and the second connection extension portion may include a terminal mounting structure E1 that is internally recessed in a shape corresponding to an outer surface of the electrode terminal 110.

For example, as illustrated in FIG. 7, in the first connection extension portion 233, a terminal mounting structure E1 that has a side wall E1s to have a shape corresponding to the outer surface of the positive electrode terminal 111, that is, to have a curve on a plane, and that is internally recessed in an upward direction may be formed. Accordingly, the first connection extension portion 233 may be positioned to contact both upper and lateral surfaces of the positive electrode terminal 111, and by closely adhering the electrode terminal 110 up to an internal end of the first connection extension portion 233 where the terminal mounting structure E1 is formed, the first connection extension portion 233 may be positioned at a preset regular position.

Also, although not illustrated in FIG. 7, in the second connection extension portion, a terminal mounting structure E1 may also be formed like in the first connection extension portion 233, and the second connection extension portion may have identical effects as the first connection extension portion 233 described above.

Accordingly, according to this configuration of the present disclosure, by forming the terminal mounting structure E1 in at least one of the first connection extension portion 233 and the second connection extension portion, a resistance of a current flow between the first connection extension portion 233 and the second connection extension portion and the electrode terminal 110 may be reduced, and moreover, the first connection extension portion 233 and the second connection extension portion may be easily positioned at the electrode terminal 110, thus further increasing the manufacturing efficiency.

Figure 8:
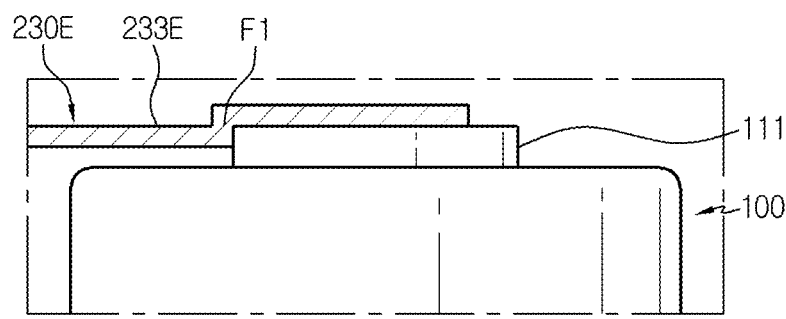
FIG. 8 is a partial side cross-sectional view schematically showing a portion of a cut side surface of a battery module according to another embodiment of the present disclosure.

FIG. 8 is a partial side cross-sectional view schematically showing a portion of a cut side surface of a battery module according to another embodiment of the present disclosure.

Referring to FIG. 8 with FIG. 2, in at least one of a first connection extension portion 233E and a second connection extension portion (not shown) according to the present disclosure, an end portion thereof coupled and connected to the electrode terminal 110 may be bent and stepped in an outward direction (upward direction) with respect to the battery module 200. Also, in at least one of the first connection extension portion 233E and the second connection extension portion, a stepped structure F1 that is configured to be mounted on the electrode terminal 110 may be formed.

In detail, in both the first connection extension portion 233E and the second connection extension portion, a stepped structure F1 that is bent and stepped in an outward direction and in a shape corresponding to an outer surface of the electrode terminal 110 may be formed.

For example, as illustrated in FIG. 8, in the first connection extension portion 233E of a bus bar 230E, a stepped structure F1 that has an internal side wall having a shape corresponding to an outer surface of the positive electrode terminal 111, that is, a curve on a plane, and that is stepped in an upward direction may be formed. Accordingly, the first connection extension portion 233E may be positioned to contact both upper and lateral surfaces of the positive electrode terminal 111, and by closely adhering the positive electrode terminal 111 up to an internal end where the stepped structure F1 of the first connection extension portion 233E is formed, the first connection extension portion 233E may be positioned in a preset regular position.

Also, although not illustrated in FIG. 8, in the second connection extension portion, a stepped structure F1 may also be formed like in the first connection extension portion 233E, and the second connection extension portion may have identical effects as the first connection extension portion 233E described above.

Accordingly, according to this configuration of the present disclosure, by forming the terminal mounting structure E1 in at least one of the first connection extension portion 233E and the second connection extension portion, a resistance of a current flow between the first connection extension portion 233E and the second connection extension portion and the electrode terminal 110 may be reduced, and moreover, the first connection extension portion 233E and the second connection extension portion may be easily positioned on the positive electrode terminal 111, thus further increasing the manufacturing efficiency.

Figure 9:
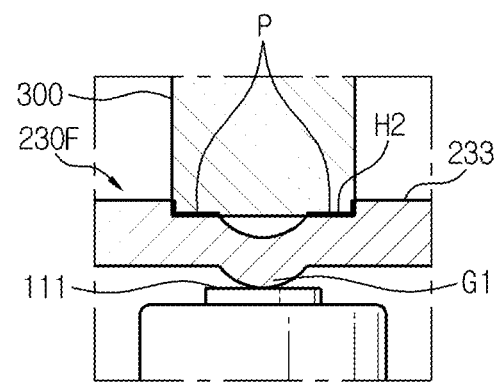
FIG. 9 is a partial side cross-sectional view schematically showing a portion of a cut side surface of a battery module according to another embodiment of the present disclosure.

FIG. 9 is a partial side cross-sectional view schematically showing a portion of a cut side surface of a battery module according to another embodiment of the present disclosure.

Referring to FIG. 9 with FIG. 2, in a first connection extension portion 233 and a second connection extension portion (not shown) of a bus bar 230F, an embossed protrusion G1 protruding in a direction toward where the electrode terminal 110 is positioned may be formed.

Furthermore, each of the first connection extension portion 233 and the second connection extension portion may be configured to contact and be connected to a welding rod 300 set to allow a current to flow therethrough. In detail, in order that the cylindrical welding rod 300 establishes electrical connection, a contact area P may be set on a surface opposite to a surface where the embossed protrusion G1 of each of the first connection extension portion 233 and the second connection extension portion is formed.

Also, the embossed protrusion G1 formed on the first connection extension portion 233 and the second connection extension portion may have an annular shape in a plan view. Also, the embossed protrusion G1 may be formed to have a greater protruding length toward a center of the annular shape of the embossed protrusion G1 in a direction toward where the positive electrode terminal 111 is formed.

Also, in the first connection extension portion 233 and the second connection extension portion, a contact area P configured to allow the welding rod 300 to establish an electrical connection may be formed. That is, the contact area P refers to an area where the welding rod 300 presses against and contacts the first connection extension portion 233 or the second connection extension portion.

For example, when the contact area P is formed along a periphery of an upper portion of the annular embossed protrusion G1, a lower surface of the welding rod 300 contacting the contact area P may be circular.

Moreover, the welding rod 300 may have a cylindrical shape having a lower surface that is a flat circle. Here, an outermost diameter of the annular shape of the embossed protrusion G1 may be smaller than a diameter of the cylindrical shape of the welding rod 300.

Thus, according to this configuration of the present disclosure, as the contact area P which is annular is set in the bus bar 230F in the periphery of an upper surface of the annular embossed protrusion G1 so that the cylindrical welding rod 300 may contact and pressurize the bus bar 230, a pressing force of the welding rod 300 may be evenly transferred to the embossed protrusion G1, and a current may be flown from the welding rod 300 to the embossed protrusion G1 at an overall uniform current density. Accordingly, according to the bus bar 230 of the present disclosure, welding between the first connection extension portion 233 or the second connection extension portion and the electrode terminal 111 may be obtained at a higher adhesive force and higher reliability.

Furthermore, in the upper portion of the embossed protrusion G1 of each of the first connection extension portion 233 and the second connection extension portion (not shown), an insertion groove H2 into which the welding rod 300 is inserted may be formed.

Also, the insertion groove H2 may have a size that allows a lower end of the cylindrical welding rod 300 in a vertical direction to be inserted thereinto. For example, when a surface of a lower end of the welding rod 300 has a flat cylindrical shape, the insertion groove H2 may have a circular shape in a plane view.

Also, the insertion groove H2 may be formed to have a certain depth in a direction toward where the electrode terminal 110 is formed. Furthermore, an inner surface of the insertion groove H2 may be set as the contact area P of the welding rod 300.

Accordingly, according to this configuration of the present disclosure, by forming the insertion groove H2, into which the lower end of the welding rod 300 is inserted, in the upper portion of the embossed protrusion G1, not only the size of the contact area P of the welding rod 300 may be increased, but a position of the welding rod 300 may also be guided along the inner surface of the insertion groove H2, thus facilitating resistance welding. Also, deviation of the welding rod 300 from the contact area P, which may occur when the welding rod 300 is pressurized, may be prevented.

The bus bar 230 may include a copper alloy. In detail, the copper alloy may include at least 60 wt % of copper in the total weight of the bus bar 230. The copper alloy may include at least one selected from zinc, chromium, and zirconium in the remaining weight percentage excluding the weight percentage of copper. However, the bus bar 230 is not limited to a copper alloy, but any metal alloy, which contains nickel, aluminum, gold, silver, or the like, as a main material may be used.

Therefore, when the bus bar 230 including a copper alloy is used, the battery module 200 according to the present disclosure has a higher conductivity than a bus bar formed of a nickel material, thereby minimizing current loss, effectively generating heat, and reducing the material cost.

Also, a plating layer may be formed using a metal having a relatively high specific resistance compared to the bus bar 230, on a surface of the bus bar 230. For example, the metal having a high specific resistance may be nickel.

Figure 11:
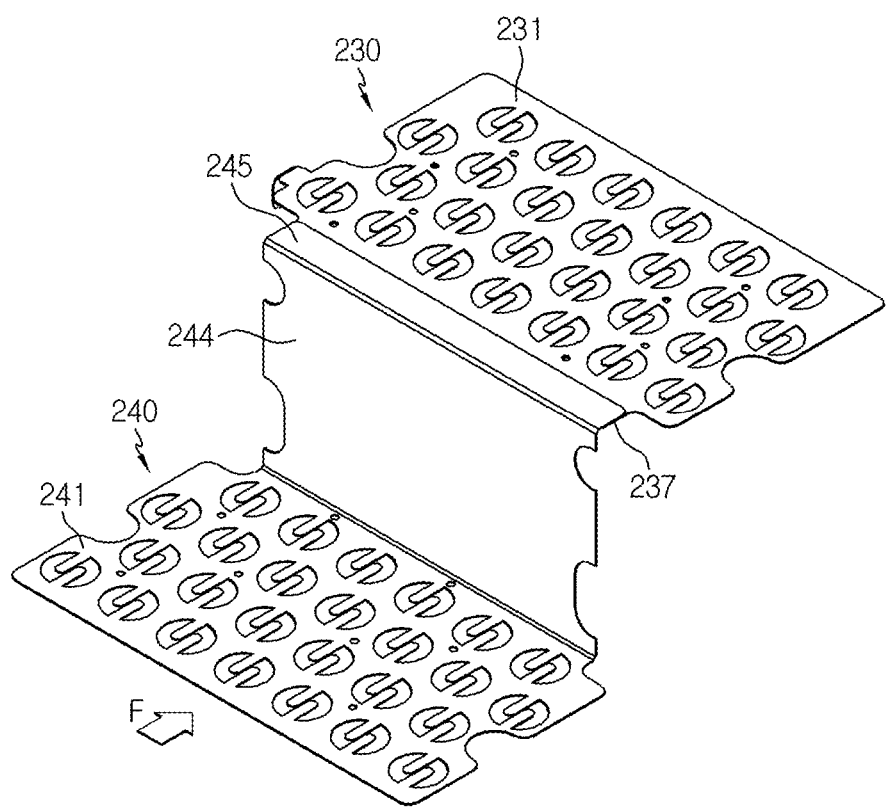
FIG. 11 is a perspective view schematically showing some components of a battery pack, according to an embodiment of the present disclosure.

FIG. 10 is a perspective view schematically illustrating a battery pack according to an embodiment of the present disclosure. FIG. 11 is a perspective view schematically showing some components of a battery pack, according to an embodiment of the present disclosure.

Referring to FIGS. 10 and 11 with FIG. 2, a battery pack 1000 according to the present disclosure may include at least two battery modules 200. In detail, the at least two battery modules 200, 201, 202, and 203 may be arranged and aligned in a direction.

For example, as illustrated in FIG. 10, four battery modules 200, 201, 202, and 203 may be arranged and aligned in the back and forth direction, and the four battery modules 200, 201, 202, and 203 may be serially and electrically connected to each other via the first bus bar 230 and the second bus bar 240. Also, the second bus bar 240 may include all of similar or identical components to the main body portion 231, the coupling opening H1, the first connection extension portion 233, and the second connection extension portion 235 of the bus bar 230 located over the battery module 200 disclosed in FIG. 3 described above.

In detail, the first bus bar may be electrically connected to the positive electrode terminal 111 formed at the upper end of the cylindrical battery cell 100. Also, the second bus bar 240 may be electrically connected to the negative electrode terminal 112 formed at the lower end of the cylindrical battery cell 100.

Furthermore, the first bus bar 230 may be mounted over the module housing 210 to contact the positive electrode terminal 111. The second bus bar 240 may be mounted under the module housing 210 to contact the negative electrode terminal 112.

Furthermore, the first bus bar 230 may include a mounting portion 237 that is formed at a front end portion of the main body portion 251 to be contacted by a portion of the second bus bar 240 when viewed in an F-direction. That is, the mounting portion 237 may have an upper surface to contact a lower surface of a portion of the second bus bar 240.

Also, the second bus bar 240 may include a bent portion 244 and a connection portion 245 connected to the bent portion 244. In detail, the bent portion 244 may have a structure that is vertically and upwardly bent from a rear end portion of the main body portion 241 of the second bus bar 240 to be extended.

Moreover, the connection portion 245 may be bent and extended backward from an upper end of the bent portion 244. Also, the connection portion 245 may be configured to be mounted on the upper surface of the mounting portion 237 of the first bus bar 230 to be electrically connected to the first bus bar 230. That is, a lower surface of the connection portion 245 may be configured to contact the upper surface of the mounting portion 237 of the first bus bar 230.

Also, the battery module 202 may include an external input/output terminal 280 electrically connected to a third bus bar 230G. Moreover, unlike the first bus bar 230 illustrated in FIG. 11, the third bus bar 230G of the battery module 202 may include a downwardly bent portion E that is bent downwards such that the third bus bar 230G is electrically contacted by and connected to the external input/output terminal 280.

Accordingly, according to this configuration of the present disclosure, the third bus bar 230G including the downwardly bent portion E may establish electrical connection with respect to the external input/output terminal 280, and thus, the time for an assembly process may be reduced.

Referring back to FIG. 10, the battery pack 1000 according to the present disclosure may further include, in addition to the battery module 200, various devices for controlling charging and discharging of the battery module 200, such as a battery management system (BMS), a current sensor, a fuse, etc.

Also, the battery pack 1000 according to the present disclosure may be applied to an energy storage device or a vehicle such as an electric vehicle or a hybrid vehicle. In other words, the vehicle according to the present disclosure may include the battery pack 1000.

Moreover, the energy storage device may be a system that stores power produced using the power producing unit and supplies the power to an electrical grid. Also, the electrical grid may be a commercial electrical network or an electrical grid that is set up in a small area. Furthermore, according to circumstances, the energy storage device may be a power storage device that stores power in a smart gird or a load or a power converting device that immediately consumes produced power.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

| | |
|---|---|
| 1000: battery pack | 230, 240: bus bar |
| 200, 201, 202, 203: battery module | 231, 241: main body portion |
| 100: cylindrical battery cell | 233: first connection extension portion |
| 111, 112: positive electrode terminal, negative electrode terminal | H1: coupling opening |
| 235: second connection extension portion | S: curved structure |
| 210: module housing | F1: stepped structure |
| C1: bent structure | G1: embossed protrusion |
| E1: terminal mounting structure | 300: welding rod |
| B1: concave structure | |
| H2: insertion groove | |

INDUSTRIAL APPLICABILITY

The present disclosure is directed to a battery module including a bus bar and a battery pack including the battery module. Also, the present disclosure is applicable to industries related to an electronic device or a vehicle including the battery pack.

What is claimed is:

1. A battery module comprising:
   a plurality of cylindrical battery cells including electrode terminals respectively at upper and lower portions of the plurality of cylindrical cells, the plurality of cylindrical battery cells being arranged in a horizontal direction;
   a module housing including an accommodation portion into which the plurality of cylindrical battery cells are accommodated; and
   a bus bar configured to contact the electrode terminals of the plurality of cylindrical battery cells to electrically connect the plurality of cylindrical battery cells, the bus bar comprising a main body portion that is over or below the plurality of cylindrical battery cells and has a plate shape that is flat in a horizontal direction, wherein at least one coupling opening perforated vertically is defined in the plate shape,
   wherein a first connection extension portion and a second connection extension portion that protrude and extend from an internal boundary of the coupling opening in different horizontal directions from each other and having end portions that are electrically connected and fixed to an electrode terminal of one of the plurality of cylindrical battery cells,
   wherein each side of each of the first and second connection extension portions has a concave structure that is inwardly curved such that a width of each of the first connection extension portion and the second connection extension portion at a proximal portion of each of the first and second connection extension portions adjacent to an inner edge of the coupling opening such that a width of each proximal portion is less than a width at a central portion of the each of the first and second connection extension portions.

2. The battery module of claim 1, wherein at least one of the first connection extension portion and the second connection extension portion comprises a bent structure that is bent at least once in the horizontal direction.

3. The battery module of claim 1, wherein at least one of the first connection extension portion and the second connection extension portion comprises a curved structure that is curved at least once in the horizontal direction.

4. The battery module of claim 1, wherein at least one of the first connection extension portion and the second connection extension portion comprises a terminal mounting structure in which a surface of an end of the at least one of the first connection extension portion and the second connection extension portion that is connected to and fixed at the electrode terminal is internally recessed in an outward direction with respect to a center of the battery module, and the internally recessed surface is mounted on the electrode terminal.

5. The battery module of claim 1, wherein at least one of the first connection extension portion and the second connection extension portion comprises a stepped structure that is configured to be mounted on the electrode terminal as an end portion that is coupled and connected to the electrode terminal and stepped in an outward direction with respect to the battery module.

6. The battery module of claim 1, wherein an embossed protrusion protruding in a direction toward the electrode terminal is defined on each of the first connection extension portion and the second connection extension portion, and
   an insertion groove configured to receive a welding rod therein is defined in the upper portion of the embossed protrusion of each of the first connection extension portion and the second connection extension portion.

7. The battery module of claim 1, wherein the bus bar comprises copper or a copper alloy.

8. A battery pack comprising at least two battery modules according to claim 1.

9. A device comprising the battery pack according to claim 8.

* * * * *